US012368713B2

(12) United States Patent
Jaiswal et al.

(10) Patent No.: US 12,368,713 B2
(45) Date of Patent: Jul. 22, 2025

(54) MITIGATING MULTIPLE AUTHENTICATIONS FOR A GEO-DISTRIBUTED SECURITY SERVICE USING AN AUTHENTICATION CACHE (71) Applicant: Palo Alto Networks, Inc., Santa Clara, CA (US)

(72) Inventors: Suraj Kumar Jaiswal, Santa Clara, CA (US); Krishna Murthy Pokuri, Sunnyvale, CA (US); Manish Pathak, Milpitas, CA (US); Aditya Srinivasa Ivaturi, Santa Clara, CA (US)

(73) Assignee: Palo Alto Networks, Inc., Santa Clara, CA (US)

( * ) Notice: Subject to any disclaimer, the term of this patent is extended or adjusted under 35 U.S.C. 154(b) by 190 days.

(21) Appl. No.: 17/473,549

(22) Filed: Sep. 13, 2021

(65) Prior Publication Data
US 2022/0337590 A1 Oct. 20, 2022

Related U.S. Application Data (60) Provisional application No. 63/176,024, filed on Apr. 16, 2021.

(51) Int. Cl.
*H04L 9/40* (2022.01)
*H04L 9/32* (2006.01)
(52) U.S. Cl.
CPC ........ *H04L 63/0892* (2013.01); *H04L 9/3213* (2013.01); *H04L 63/0807* (2013.01)

(58) Field of Classification Search
CPC ............. H04L 63/0892; H04L 63/0807; H04L 9/3213
See application file for complete search history.

(56) References Cited

U.S. PATENT DOCUMENTS

| | | | | |
|---|---|---|---|---|
| 2005/0138362 A1* | 6/2005 | Kelly | .................. | H04L 63/0807 713/156 |
| 2006/0123472 A1* | 6/2006 | Schmidt | .............. | H04L 63/0815 726/8 |
| 2009/0300740 A1* | 12/2009 | Verma | ................... | H04L 63/062 726/6 |
| 2012/0054846 A1* | 3/2012 | Lightsey | ................. | H04L 67/14 726/9 |
| 2013/0283362 A1* | 10/2013 | Kress | ...................... | G06F 21/44 726/9 |

(Continued)

OTHER PUBLICATIONS

Juels, A.; Jakobsson, M.; Jagatic, T.N.; "Cache cookies for browser authentication," IEEE Symposium on Security and Privacy (S&P'06), Berkeley/Oakland, CA, USA, 2006, 5 pages.*

(Continued)

*Primary Examiner* — Victor Lesniewski
(74) *Attorney, Agent, or Firm* — Van Pelt, Yi & James LLP (57) ABSTRACT Mitigating multiple authentications for a geo-distributed security service is disclosed. A request to access a web service from a client device is received. The request is redirected to a geo-distributed authentication service including a distributed cache for storing a user's authentication authorization. An authorization token included in a distributed authentication cache cookie and uniform resource locator (URL) for the web service to facilitate secure access to the web service from the client device are returned.

6 Claims, 10 Drawing Sheets

(56) References Cited

U.S. PATENT DOCUMENTS

| | | | | |
|---|---|---|---|---|
| 2014/0040993 | A1* | 2/2014 | Lorenzo | G06F 21/6236 726/4 |
| 2015/0134956 | A1* | 5/2015 | Stachura | H04L 63/168 713/168 |
| 2017/0346807 | A1* | 11/2017 | Blasi | H04L 63/0442 |
| 2019/0103968 | A1* | 4/2019 | Srinivasan | H04L 9/0894 |
| 2019/0197060 | A1* | 6/2019 | Casadio | G06F 16/2428 |
| 2020/0007531 | A1* | 1/2020 | Koottayi | H04L 67/146 |
| 2020/0106766 | A1* | 4/2020 | Suraparaju | H04L 67/563 |
| 2020/0250664 | A1* | 8/2020 | Kumar | H04L 63/0838 |
| 2020/0296112 | A1* | 9/2020 | Namboodiri | G06F 21/44 |
| 2020/0351248 | A1* | 11/2020 | Bonci | H04L 63/0815 |
| 2021/0288794 | A1* | 9/2021 | O'Neill | H04L 9/14 |
| 2021/0320911 | A1* | 10/2021 | AlDarazi | H04L 9/0643 |

OTHER PUBLICATIONS

Joseph, Justin; Bhadauria, Saumya; "Cookie Based Protocol to Defend Malicious Browser Extensions," International Carnahan Conference on Security Technology (ICCST), Chennai, India, 2019, 6 pages.*

* cited by examiner

FIG. 2B https://global-qa.acs.panclouddev.com/acs?fw_token=eyJhbGciOiAiSFMyNTYiLCAia2lkIjoglmZnOUt6NFRFdHB1S2lReUVjYjk4WEhUWXhSMXRqcDJwZHlPMV9WVzNBSUEifQ.eyJkZXN0IjoiaHR0cHM6Ly93d3d3d3d3d3d3d3d3d3d3d3d3d3d3d3d3d3d3d3d3cuZjUuY29tLylsInRuaWQiOjE2NzIwNjkxxNzIsImluc3QiOiJTV0dQUk9YWV81NjlxNDJfbWUtc291dGgtMSIsImV4cCI6MTY0NDQ0MTkzODczLCJpYXQiOjE2NDQ0MDM5MzgsIm5iZiI6MTY0NDQwMzkzOH0.dGgtMV9hZG5lb2Vlb3NjeS5MT2NyIiwic19pZCl6NDQ0MTkyODczLCJpc3MiOiJTV0dQUk9YWV81NjlxNDJfbWUtc291dGgtMSIsIm1heCI6MTY0NDQ0MTkzODczfQ
A5MzcxLCJzcmNNfaXAiOiIxMy4yMTIuODMuMjcifQ.Ys08dPYBP0TnHVv1LMvIu8PiwtuZZ
EvZwekdexfYc8c

FIG. 3A https://www.webapp1.com/_proxy_auth?acs_token=eyJhbGciOiJkaXIiLCJlbmMiOiJBMTI4Q0JDLUhTMjU2In0..g3O3rKlqe9YmwkpKRitc6A.L2K1oKjnWLJqh018DZxbbGs2xTVLTajurH2MrFJDnf26EkxddcGbLXp8Eoc-yXVhoWuQXtru-TBdSqREIBThQy1IC7-_HF8edyGuOfSmnRWIvH03X-knVxj2ACThr82YWJRf5ROltITPsk_smyqVSQ.hG6u-XBCo30A0CMjsEjQoA

FIG. 7 session_id=+0pzfKPcEk5tuZEqU9UMvIin4XqakxFkLJ72wx9cYRU=
  ip_address='44.234.243.153',
  region='us-central1',
  session_creation_time=PENDING_COMMIT_TIMESTAMP(),
  session_expiry_time='2021-02-20T01:31:38.810813136Z',
  user_agent='Mozilla/5.0 (Windows NT 10.0; Win64; x64)',
  user_name='alice@example.com'

FIG. 8

MITIGATING MULTIPLE AUTHENTICATIONS FOR A GEO-DISTRIBUTED SECURITY SERVICE USING AN AUTHENTICATION CACHE

CROSS REFERENCE TO OTHER APPLICATIONS

This application claims priority to U.S. Provisional Patent Application No. 63/176,024 entitled MITIGATING MULTIPLE AUTHENTICATIONS FOR A GEO-DISTRIBUTED SECURITY SERVICE USING AN AUTHENTICATION CACHE filed Apr. 16, 2021 which is incorporated herein by reference for all purposes.

BACKGROUND OF THE INVENTION

A firewall generally protects networks from unauthorized access while permitting authorized communications to pass through the firewall. A firewall is typically a device or a set of devices, or software executed on a device, such as a computer, that provides a firewall function for network access. For example, firewalls can be integrated into operating systems of devices (e.g., computers, smart phones, or other types of network communication capable devices). Firewalls can also be integrated into or executed as software on computer servers, gateways, network/routing devices (e.g., network routers), or data appliances (e.g., security appliances or other types of special purpose devices).

Firewalls typically deny or permit network transmission based on a set of rules. These sets of rules are often referred to as policies. For example, a firewall can filter inbound traffic by applying a set of rules or policies. A firewall can also filter outbound traffic by applying a set of rules or policies. Firewalls can also be capable of performing basic routing functions.

BRIEF DESCRIPTION OF THE DRAWINGS

Various embodiments of the invention are disclosed in the following detailed description and the accompanying drawings.

DETAILED DESCRIPTION

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Overview of Techniques for Mitigating Multiple Authentications for a Geo-Distributed Security Service Using an Authentication Cache Cloud delivered services, such as a Secure Web Gateway (or Forward Proxy), are being used to enforce Zero Trust Access to networks and SaaS apps whereby only users with a valid identity are able to access desired services. Also, such services are now being used to enforce advanced security services, such as malware checks, policies, device posture, etc., on the egress/ingress traffic.

In current systems, authentication services are typically co-located with Security Processing Nodes (SPNs) (e.g., this can be Palo Alto, PA, Firewall VM instance). The authentication can happen in the data path or the control plane of the SPN. Even when the authentication service is separated from the SPN, the authentication service is simply a service (e.g., typically implemented as a microservice) located in close proximity to the SPN or tightly coupled to the SPN scale and geo location.

In some embodiments, the authentication service is decoupled from the SPN. As an example, an Authentication Cache Service (ACS) is a separate service that scales independently of the SPN. Through the use of an authentication token, this separation makes sure an already authenticated user does not get a re-authentication request just because the user's traffic gets load balanced to a new SPN via a network load balancer. Additionally, this separation has the advantage that the SPN does not incur central processing unit (CPU) costs for the slow authentication control flow whereby the SPN is required to establish identity with an independent identity provider (IdP), such as Okta, Azure AD, Ping Identity etc., logging (e.g., user session authentication failure, success, etc.), etc.

In some embodiments, a system, process, and/or computer program product for mitigating multiple authentications for a geo-distributed security service using an authentication cache includes providing stateless authentication for the geo-distributed security service. For example, the SPN can be implemented to be completely stateless with respect to the user authentication state (e.g., the SPN is not required to store any authentication state information).

In some embodiments, a system, process, and/or computer program product for mitigating multiple authentications for a geo-distributed security service using an authentication cache includes using a geo-replicated database as a cache to store authentication configuration information (e.g., IdP information, such as a single sign-on (SSO) uniform resource location (URL), certificate, etc.).

In some embodiments, a system, process, and/or computer program product for mitigating multiple authentications for a geo-distributed security service using an authentication cache includes using a geo-replicated database as a cache to store the authenticated state information for a user.

In some embodiments, a system, process, and/or computer program product for mitigating multiple authentications for a geo-distributed security service using an authentication cache includes using a JavaScript Object Notation Web Token (JWT) to share authentication state information. For example, the authentication state can be transferred between the nodes (e.g., SPN and Authentication instance) using signed and encrypted JWT tokens.

For example, the disclosed techniques mitigate user re-authentications due to SPN load balancing or cloud provider events, such as zone unavailability, etc., leading to improved quality of experience (QoE) for end users.

Also, the disclosed techniques for mitigating multiple authentications for a geo-distributed security service using an authentication cache keep SPNs stateless with respect to a user authentication state, thereby facilitating scalability of the SPNs.

In addition, by abstracting out authentication management from SPNs, the disclosed techniques for mitigating multiple authentications for a geo-distributed security service using an authentication cache facilitate agility whereby SPNs need not be modified/upgraded for new changes to the authentication service (e.g., incorporating new identity management solutions, switching IdP vendors, or adding support such as multi-factor authentication (MFA) to existing authentication mechanisms, etc.).

Further, the disclosed techniques for mitigating multiple authentications for a geo-distributed security service using an authentication cache facilitate a reduced connection load on the log database or data lake, whereby only few service instances are connected to the data lake for streaming authentication logs rather than logs from a multitude of SPNs (e.g., using the disclosed techniques only the ACS service instances need to connect to the data lake which in turn reduces the load on the SPNs and keeps its implementation simple).

In some embodiments, a system/method/computer program product for mitigating multiple authentications for a geo-distributed security service using an authentication cache includes receiving a request to access a web service from a client device; redirecting the request to a geo-distributed authentication service including a distributed cache for storing a user's authentication authorization; and returning an authorization token included in a distributed authentication cache cookie and uniform resource locator (URL) for the web service to facilitate secure access to the web service from the client device.

In some embodiments, the returning of the authorization token included in the distributed authentication cache cookie and the uniform resource locator (URL) for the web service to facilitate secure access to the web service from the client device includes receiving a signed and encrypted token via a browser redirect; upon receiving the signed and encrypted token: decrypting and validating the signed and encrypted token; sending another redirect to the original URL; and setting a site cookie for the domain with user information; validating the site cookie; and in the event that the site cookie is valid, allowing the user access to the web service.

In some embodiments, the redirecting of the request to the geo-distributed authentication service includes checking for the site cookie associated with a user's authentication state; and in response to a determination that the site cookie is missing or invalid, redirecting the request to the geo-distributed authentication service.

In some embodiments, the system/method/computer program product for mitigating multiple authentications for a geo-distributed security service using an authentication cache further includes receiving another request to access another web service from the client device; checking for a site cookie associated with a user's authentication state; and in response to a determination that the site cookie associated with the user's authentication state exists and is valid, allowing the other request to go to a URL for the other web service.

In some embodiments, the authorization token includes a time value of validity, wherein the time value of validity includes a time until the authorization token is invalid; and the allowing of the other request to go to the URL for the other web service includes comparing a current time value with the time value of validity; and in response to a determination that the current time value exceeds the time value of validity: omitting to allow the other request to go to the URL for the other web service; and redirecting the other request to the geo-distributed authentication service.

In some embodiments, the authorization token includes a time value of validity, wherein the time value of validity includes a time until the authorization token is invalid; and the sending of the other redirect to the URL for the other web service includes: comparing a current time value with the time value of validity; and in response to a determination that the current time value exceeds the time value of validity: omitting to send the other redirect to the URL for the other web service; and redirecting the other request to the geo-distributed authentication service.

The system of claim 1, wherein the authorization token includes an original URL, a current timestamp, a time value of validity, firewall instance id, tenant-id, firewall session-id, or any combination thereof.

Figure 1:
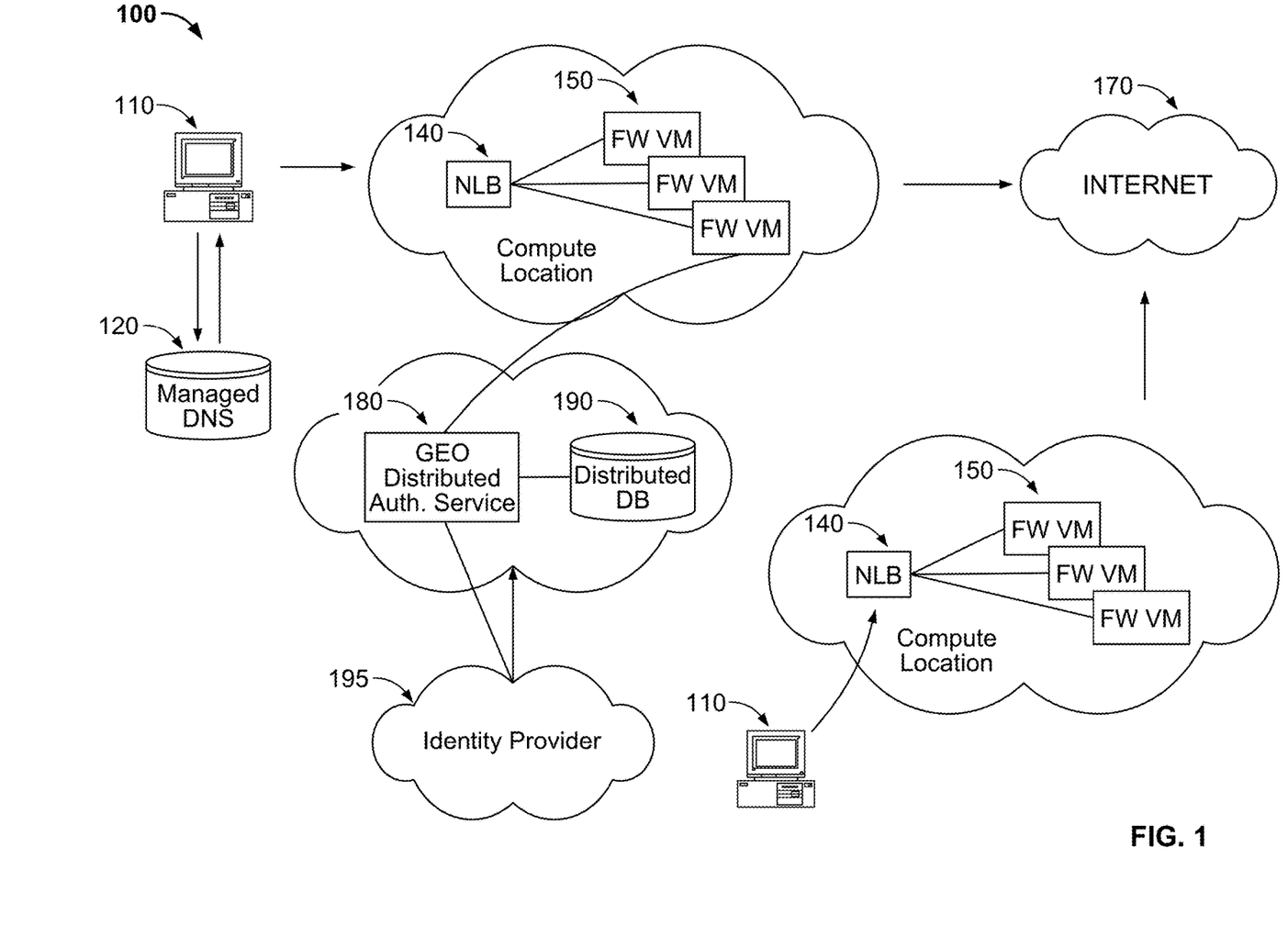
FIG. 1 is a system diagram illustrating an example geo-replicated authentication service using an authentication cache in accordance with some embodiments.

Example Embodiments for Mitigating Multiple Authentications for a Geo-Distributed Security Service Using an Authentication Cache FIG. 1 is a system diagram illustrating an example geo-replicated authentication service using an authentication cache in accordance with some embodiments.

Referring to FIG. 1, the disclosed architecture 100 includes a user client 110. The user client 110 can be a laptop computer, desktop computer, tablet computer, or the like. The user client 110 accesses the Internet 170 using a managed domain name server (DNS) 120 to resolve in an IP address of a web server providing a web service. Before accessing the Internet 170, user client 110 must first be authenticated to have a valid identity to access the desired web services on the Internet 170. In some embodiments, the network load balancer (NLB) 140 forwards the traffic to a firewall virtual machine (FWVM)/Security Processing Node (SPN) 150 in a round robin manner, lowest processing load, etc. Because, if the user client 110 has already been authenticated by an SPN 150 once, a new SPN 150, when the new SPN 150 receives traffic for authentication, does not need to re-authenticate the user client if the traffic is received while the site cookie is valid.

The disclosed example architecture helps in scaling the SPN path given that it does what it is designed to do, that is, forward data traffic and enforce security services on this traffic. In this disclosed example architecture, a trust relationship is established between the SPN 150 and the elastic authentication service, which is used to communicate the authenticated identity of the user. Also, in this disclosed example architecture, a geo-replicated database is used to store an identity established with an identity provider or IdP 195 for the user sessions. For example, the geo-replicated database or distributed database 190 allows the architecture to cache and distribute the authenticated identity state information thereby reducing multiple full blown authentication control flows upon data plane events, such as SPN scale out, DNS changes, cloud provider events, such as availability zone failures, etc.

In the disclosed example architecture, a tenant (customer) configures clients 110 to use our Explicit Proxy (or, Secure Web Gateway) service 150. In this configuration, the tenant provides information for authenticating its users using IdP 195, such as Okta, Azure AD, etc. When the tenant pushes the configuration (config), the config parsing lambda function in the orchestrator infra parses out the authentication information and pushes this to the Spanner database (DB) residing in a cloud platform (CP). This Spanner DB is geo replicated across the globe. Also, during the tenant onboarding the symmetric keys to the SPN instances and the authentication service, the onboarding helps form a secure trust between SPNs and the authentication service can be distributed.

In the event that a user uses a Hypertext Transfer Protocol (HTTP) Connect method to reach the Explicit Proxy service, the user's browser will use a fully qualified domain name (FQDN) for the proxy available from a proxy auto-configuration (PAC) file being used in the browser or the operating system (OS). This FQDN is managed by name server 1 (NS1) managed DNS provider. The FQDN is to resolve to an NLB IP address closest to the tenant's user. The user traffic will hit one of the SPNs 150 sitting behind the NLB 140.

The SPN 150 is to require the user to authenticate him or herself. Upon receiving traffic from the user, the SPN 150 checks for a site cookie with an authentication state. If the site cookie is missing or invalid, the SPN 150 redirects the traffic through the user browser with a signed JSON Web Token (JWT) token in the URL (e.g., the HTTP response has the location header set to this URL, which points to an ACS or geo distributed authentication service 180). This signed JWT token can include one or more of the following: the original URL, a current timestamp, valid for time (e.g., number of seconds this token is valid), FW instance id, tenant-id, and/or FW session-id.

The ACS 180 is to read the config for the user's tenant from the Spanner DB or a local cached copy 190. The config has all the information for the service to force the user to verify their identity with the configured IdP 195. The ACS 180 redirects the user to authenticate its identity with the IdP 195 which finally returns a Security Assertion Markup Language (SAML) assertion with user details, which the ACS 180 saves in the Spanner DB 190.

Subsequently, the ACS 180 sends a signed and encrypted JWT token to the SPN 150 via a browser redirect. The JWT token includes a time value of validity (or information expiration timestamp), session id, and original URL. The JWT token also sets a site cookie with a random key to the user details as value for the ACS domain (e.g., this cookie allows the ACS 180 to store authenticated state with respect to itself on the browser preventing a subsequent SAML authentication control flow for the user when the user traffic gets redirected to the ACS 180), and the ACS 440 stores the authentication state of the user.

The SPN 150 validates the JWT token received from the authentication service 180 via the browser and sends another redirect to the original URL without any added query parameters. The SPN 150 also sets a site cookie for the domain with user information (e.g., to store authentication session information on the browser). The SPN 150 validates the site cookie for the domain and if the site cookie is valid (e.g., not reached the expiration time), then the SPN 150 allows the user to access the actual web resource.

Example ACS Implementation Details

In an example implementation, the ACS 180 is a scale out service built using Kubernetes (an open-source container-orchestration system for automating computer application deployment, scaling, and management). This service is geo deployed to provide high availability as well as geo load balancing for the authentication control traffic (e.g., the domain of the ACS is configured in the DNS server 120 to provide a DNS A record answer using geo-proximity). When the SPN 150 redirects the user traffic for authentication to the ACS 180, the location header in the HTTP response has the ACS domain. The ACS domain is resolved to an ACS cluster 150 in geo-proximity to the user (e.g., we use the NS1 managed DNS provider to host the ACS domain with multiple A records where each A record corresponds to an NLB IP address allocated to a particular ACS cluster 150 in a geo location). Once the user traffic gets to the ACS 180, the authentication is performed between the user and the IdP 195, and the ACS 180 gets the SAML assertion for the authentication state and caches authentication state information in the Spanner DB 190. The ACS 180 then propagates the authentication state information to the SPN 150 using the JWT token as similarly described above.

Figure 2A:
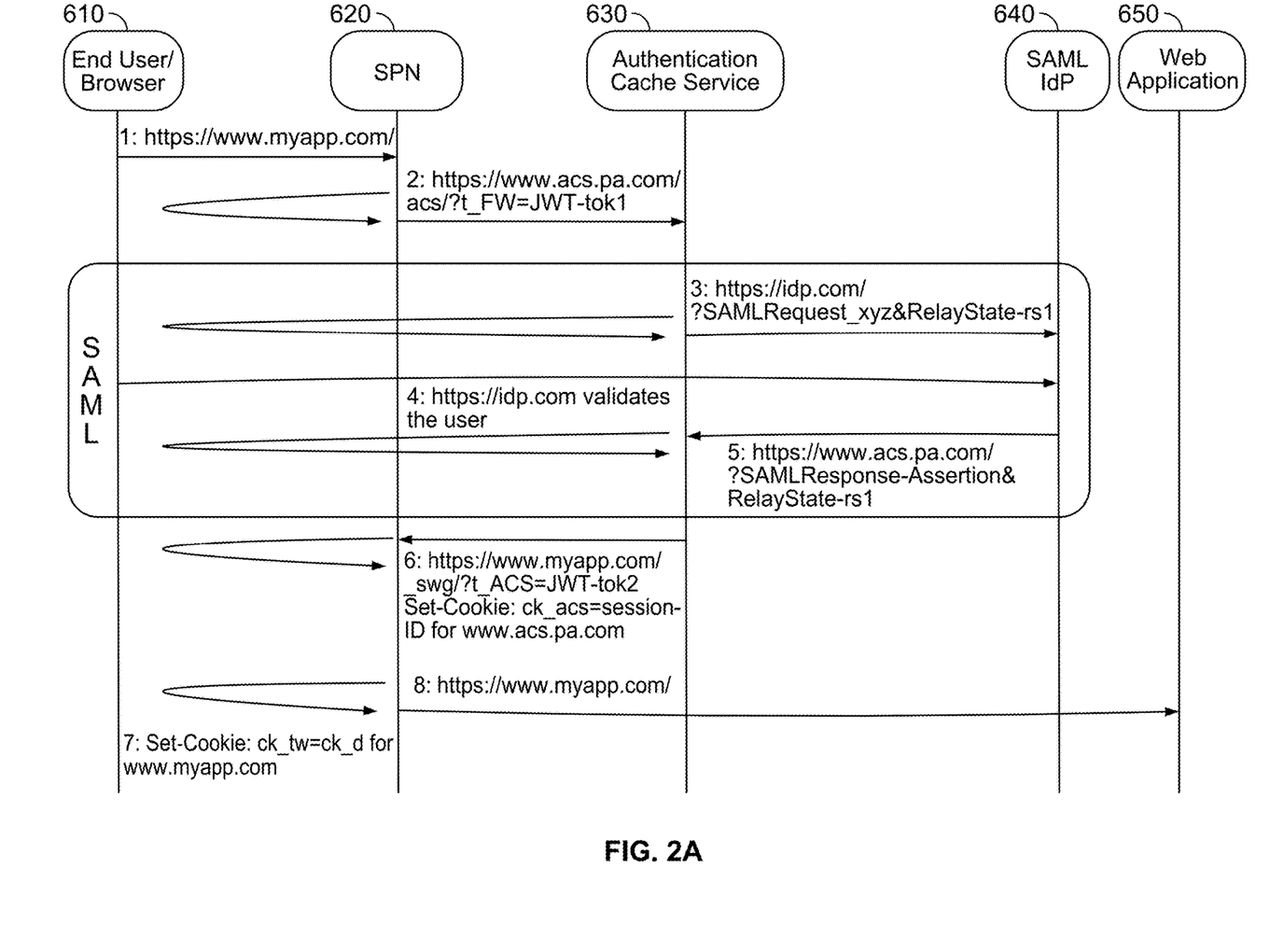
FIG. 2A is a messaging flow diagram illustrating an example of a geo-replicated authentication service using an authentication cache prior to authentication in accordance with some embodiments.

FIG. 2A is a messaging flow diagram illustrating an example of a geo-replicated authentication service using an authentication cache prior to authentication in accordance with some embodiments.

Referring to FIG. 2A, the end user/browser 610 sends an HTTP request, for example, www.myapp.com, to the Security Processing Node (SPN) 620 for authentication (step 1). In some embodiments, the SPN 620 is a firewall (FW) proxy. The SPN 620 then sends a request to an authentication cache service (ACS) 630 (step 2). The authentication cache service 630 checks whether the traffic is destined for the SPN 620. In response to a determination that the traffic is destined for the SPN 620, the SPN 620 decrypts the traffic and checks for a site cookie set by the SPN 620. In response to a determination that the SPN 620 does not find a valid cookie or the cookie is not valid for the application, the SPN 620 redirects the user to the ACS 630 for authentication through the browser with a signed JWT Token JWT-Tok1. As an example, the JWT Token includes the original URL, current timestamp, session start time, FW instance name, tenant-id, source-ip, and FW session-id. In the event that the end user/browser 610 has not been authenticated by the authentication cache service 630, the authentication cache service 630 sends a request to an SAML identity provider (IdP) 640 (step 3). The SAML IdP 640 authenticates the user (for example, the SAML IdP 640 requests username and password from the user or uses multi-factor authentication (MFA)) (step 4). After successful authentication of the user, the SAML IdP 640 sends an SAML assertion (for example, the SAML assertion includes user details and RelayState parameter) to the ACS 630 (step 5). In some embodiments, the RelayState parameter is an opaque identifier and stores state information at the ACS 630. The ACS 630 sends a signed and encrypted JWT Token JWT-Tok2 to the SPN 620 via a browser redirect and sets a site cookie ck_acs with a random key to the user information as a value for an ACS domain (step 6). As an example, the signed and encrypted JWT Token JWT-Tok2 includes a time value of validity (or an information expiration timestamp), user id, and original URL. The SPN 620 decrypts and validates the signed and encrypted JWT Token JWT-Tok2 from the ACS 630, sends another redirect to the original URL, and sets a site cookie for the domain with the user information (step 7). The SPN 620 validates the site cookie (e.g., verifies that the site cookie is not expired) and in the event that the site cookie is valid, the SPN allows the request to go to the web application/service 650 (e.g., www.myapp.com) (step 8).

Figure 2B:
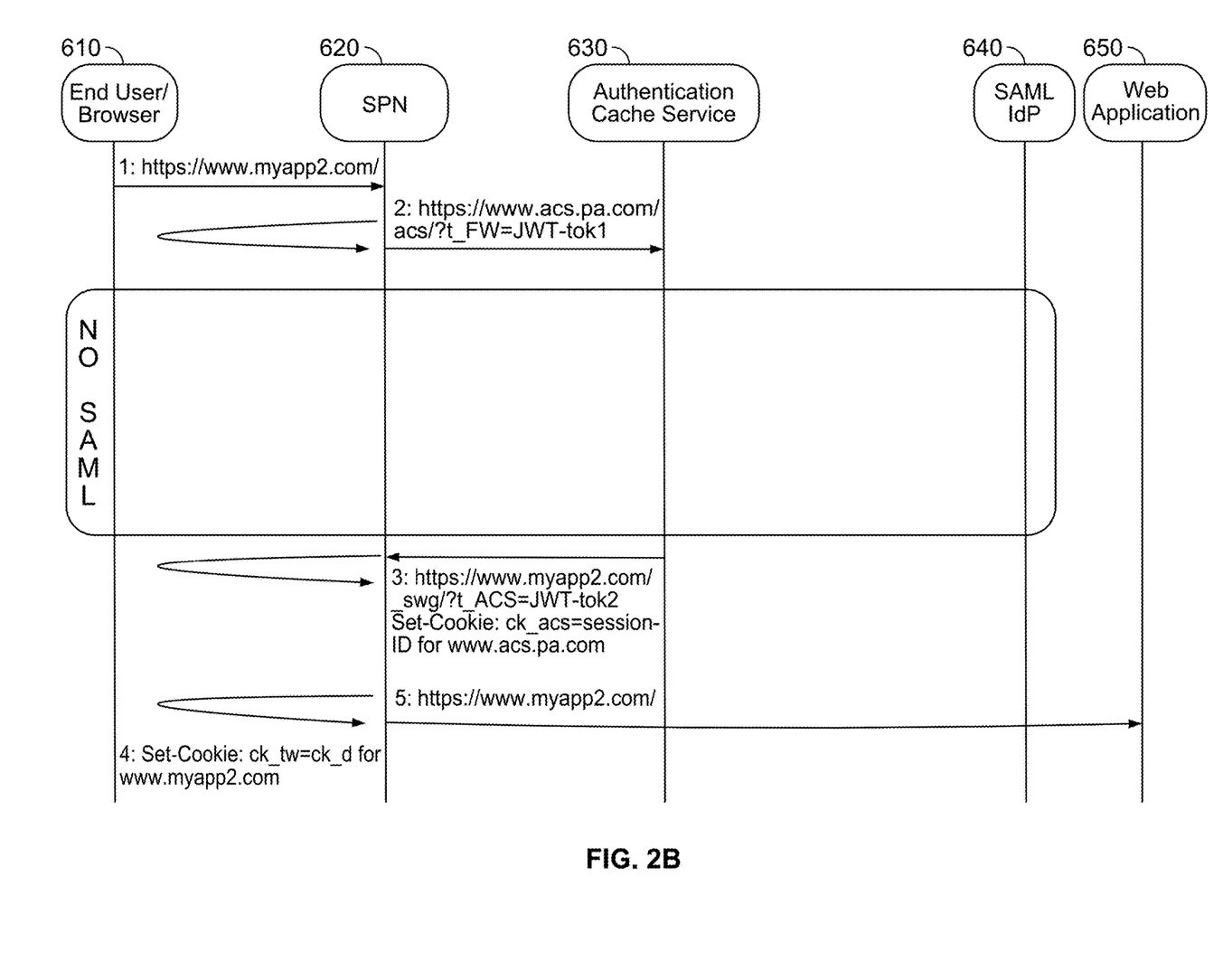
FIG. 2B is a messaging flow diagram illustrating an example of a geo-replicated authentication service using an authentication cache after authentication in accordance with some embodiments.

FIG. 2B is a messaging flow diagram illustrating an example of a geo-replicated authentication service using an authentication cache after authentication in accordance with some embodiments.

Referring to FIG. 2B, the end user/browser 610 sends a new HTTP request for a new web application, for example, www.myapp2.com, to the SPN 620 (step 1). The SPN 620 checks whether the traffic is destined for the SPN 620. If the traffic is destined for the SPN 620, the traffic is to be decrypted and checked if a cookie is set by the SPN 620. In response to a determination that the SPN 620 does not find a valid cookie or the cookie is not valid for the application, the SPN 620 redirects the user to the ACS 630 for authentication through the browser with a signed JWT Token JWT-Tok1 (step 2). As an example, the JWT Token includes the original URL, current timestamp, session start time, FW instance id, tenant-id, and FW session-id. In some embodiments, the FW instance id and the FW session-id are used for debugging and tracing the session between the SPN 620 and the ACS 630. In response to a determination that the SPN 620 finds a valid cookie, the ACS 630 sends an encrypted and signed JWT Token JWT-Tok2 to the SPN 620 via a browser redirect (step 3). As an example, the encrypted and signed JWT Token JWT-Tok2 includes a time value of validity (or an information expiration timestamp), user id, and original URL. The SPN 620 decrypts and validates the encrypted and signed JWT Token JWT-Tok2 from the ACS 630 and sends another redirect to the original URL, and sets, at the end user/browser 610, a site cookie for the domain with the user information (step 4). The SPN 620 validates the site cookie (e.g., determines that the site cookie is not expired) and in the event that the site cookie is valid, the SPN allows the request to go to the web application/service 650 (e.g., www.myapp2.com) (step 5).

Figure 3A:
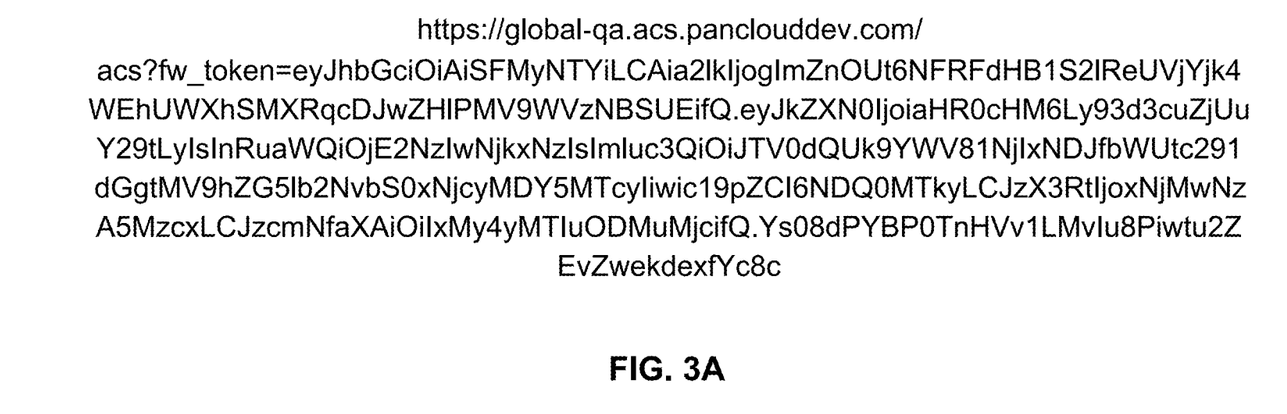
FIG. 3A is an example of an encoded authorization token sent from a security processing node to an authentication cache service.

FIG. 3A is an example of an encoded authorization token sent from a security processing node to an authentication cache service.

If the security processing node does not file a valid cookie, the security processing node redirects the user to the ACS using an encoded authorization token, as discussed in step 2 of FIG. 2A. An example of the encoded authorization token is shown in FIG. 3A.

Figure 3B:
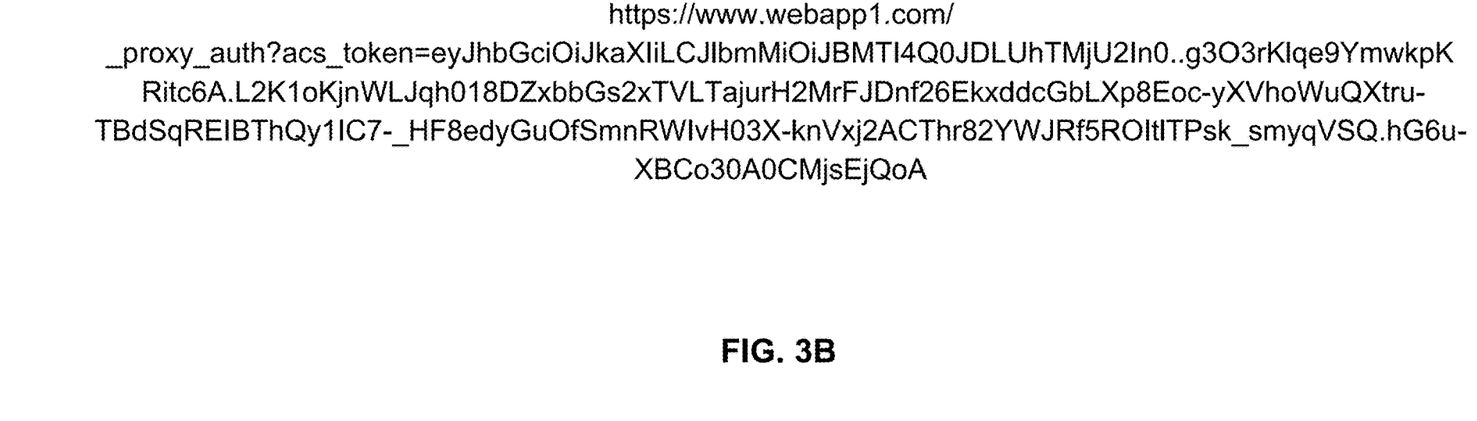
FIG. 3B is an example of an encoded authorization token sent from an authentication cache service to a security processing node.

FIG. 3B is an example of an encoded authorization token from an authentication cache service to a security processing node.

After the cookie is determined to be valid, which indicates that the user has been authenticated and the cookie has not expired based on an analysis of a time value of validity (or the information expiration timestamp), an encoded authorization token is sent from the ACS to the SPN, as discussed in step 6 of FIG. 2A. An example of the encoded authorization token is shown in FIG. 3B.

Figure 4:
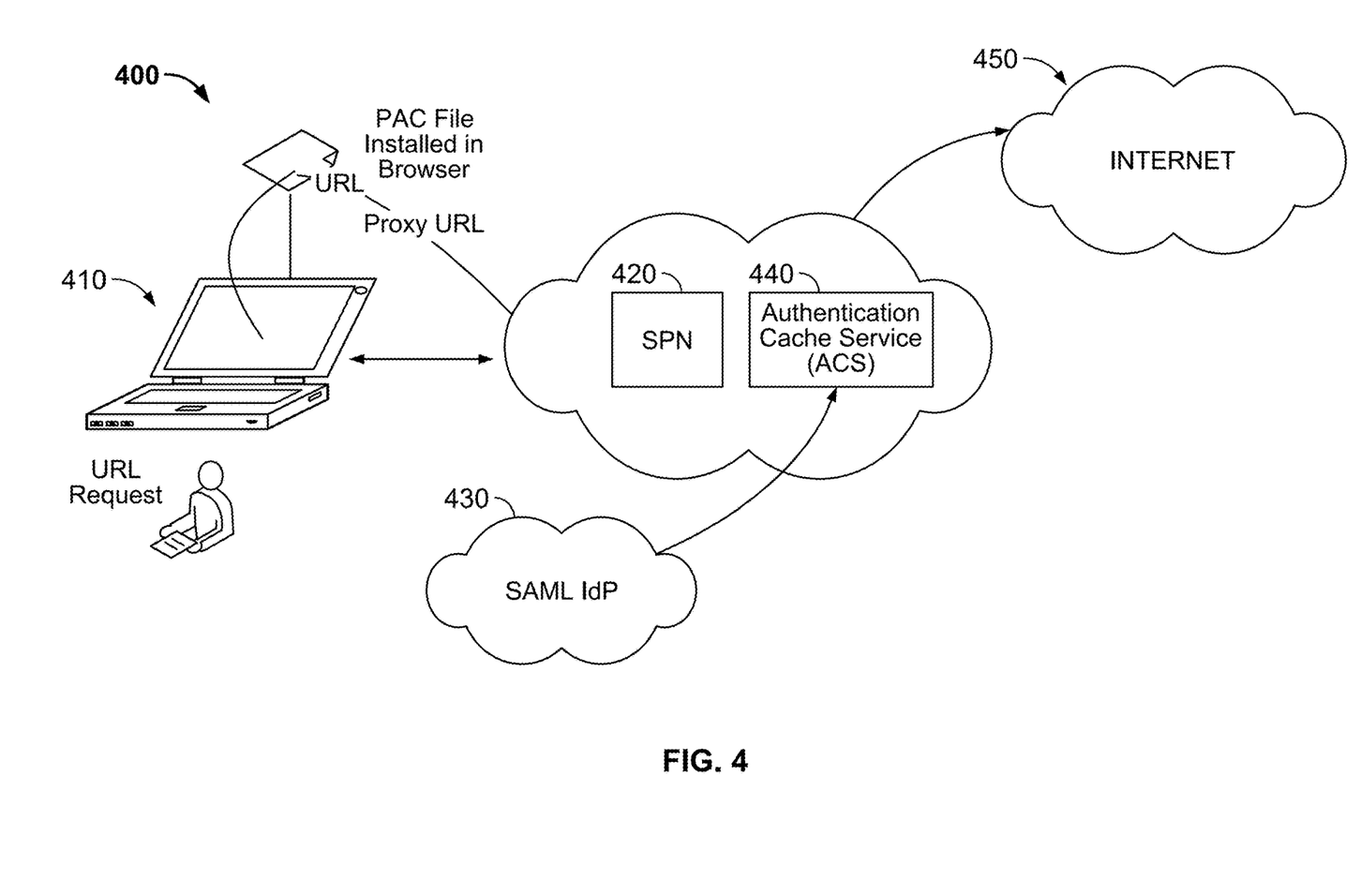
FIG. 4 is a system diagram illustrating another example geo-replicated authentication service using an authentication cache in accordance with some embodiments.

FIG. 4 is a system diagram illustrating another example geo-replicated authentication service using an authentication cache in accordance with some embodiments.

Referring to system 400 of FIG. 4, a proxy is configured for a browser or an operation system via a proxy auto-configuration (PAC) file on a client 410, whereby an IP address or a fully qualified domain name (FQDN) of an SPN is configured in the PAC file. In some embodiments, the PAC file is pushed onto a client. Subsequently, when the client 410 browses the Internet 450 by sending a URL request using a browser, the browser checks for the PAC file and forwards the URL request to the SPN 420 based on the IP address or the FQDN of the SPN included in the PAC file. The SPN 420 then decrypts the traffic and checks for an authentication cookie set up by the SPN 420. In some embodiments, the authentication cookie includes information that identifies the user and information is used to authenticate the user. The SPN 420 determines whether the user has been authenticated and in the event that the user has been determined not to be authenticated, the SPN 420 redirects the user to the authentication cache service (ACS) 440 for authentication. The ACS 440 sends an authorization request to the IdP 430. After the IdP 430 authenticates the user, the authentication cache service (ACS) 440 stores the authentication state of the user. In some embodiments, the validity period of the authentication is based on a time value of validity specified (or an expiration timestamp). The SPN 420 checks for the presence and validity of an authentication cookie. If the authentication cookie is not present or is invalid, the user is redirected to the ACS 440. As an example, if the authentication cookie exists, the SPN 420 checks whether the current time has passed the time value of validity (or the expiration timestamp specified), and in the event that the time value of validity has not passed, the SPN 420 determines that the cookie is valid. After the ACS 440 confirms that the user has been authenticated, the user is redirected to the SPN 420 with a token. The SPN 420 then validates the token and sets a site cookie for that domain for the user. The SPN 420 applies security enforcement based on security policy rules that are configured by the administrator. In the event that no security policy rules are violated, the SPN 420 allows the URL request to go to the Internet 450.

Figure 5:
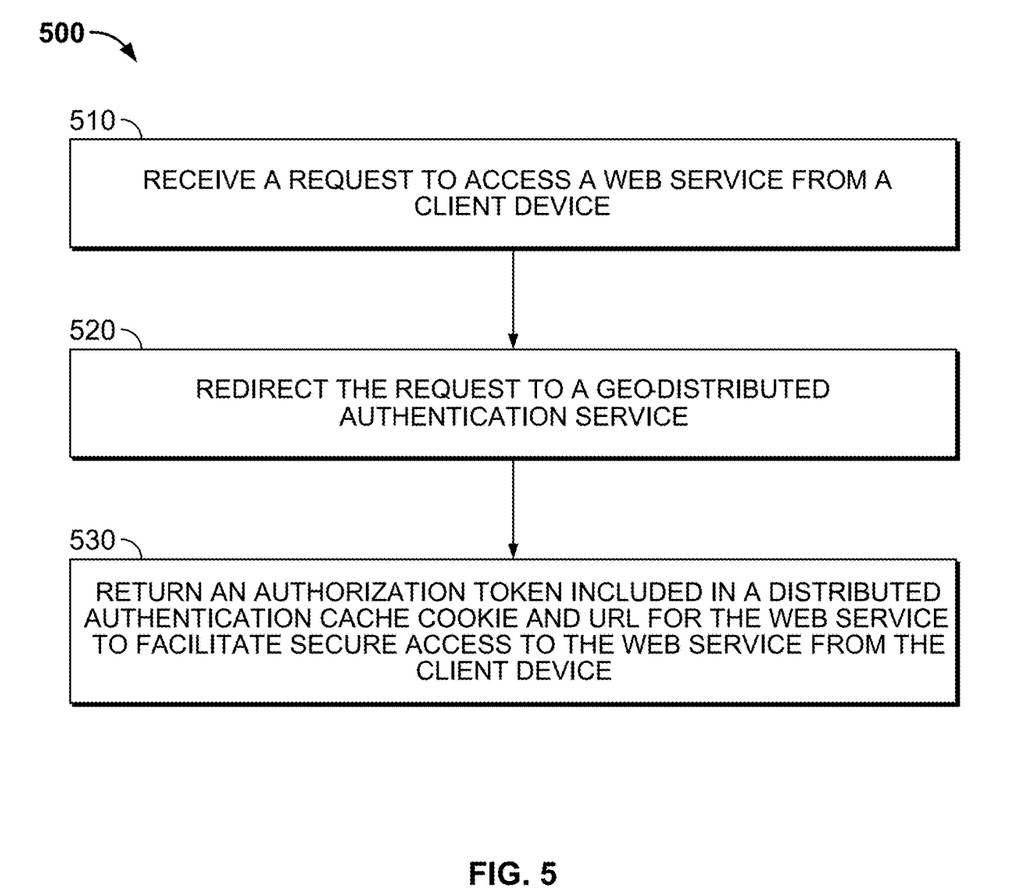
FIG. 5 is a flow diagram illustrating a process for utilizing a geo-replicated authentication service using an authentication cache in accordance with some embodiments.

FIG. 5 is a flow diagram illustrating a process for utilizing a geo-replicated authentication service using an authentication cache in accordance with some embodiments. In some embodiments, the process 500 is implemented by a firewall proxy 150 of FIG. 1 and comprises:

In 510, the firewall proxy receives a request to access a web service via a uniform resource locator (URL) from a client user. For example, the web service corresponds to a website such as, for example, www.facebook.com, www.google.com, www.yahoo.com, or the like.

In some embodiments, a user receives a PAC file to configure a browser or the operating system to add an IP address or a fully qualified domain name (FQDN) of a network load balancer (NLB) or the firewall proxy 150 as a proxy, so when a user sends a request for a web service, the browser redirects the request to the NLB or the firewall proxy 150.

In 520, the firewall proxy redirects the request to a geo-distributed authentication service including a distributed cache for storing a user's authentication authorization.

As an example, after the firewall proxy receives an HTTP request for a web service, the firewall proxy checks whether a valid cookie exists for the web service. In the event that a valid cookie does not exist for the web service, the firewall proxy redirects the user to the geo-distributed authentication service. In the event that the geo-distributed authentication service does not locate a session for the user, the geo-distributed authentication service sends an authorization request to a Security Assertion Markup Language (SAML) identity provider (IdP), which proceeds to authenticate the user (e.g., via username and password, or MFA). After the user has been successfully authenticated, the SAML IdP sends a SAML assertion including the user details to the geo-distributed authentication service, and after the IdP successfully authenticates the user, the geo-distributed authentication service sends an authorization token to the firewall proxy. In some embodiments, the user details include User ID/name/email, user's group information, and the RelayState parameter.

In 530, the firewall proxy returns an authorization token included in a distributed authentication cache cookie and a uniform resource locator (URL) for the web service to facilitate secure access to the web service from the client device.

Subsequently, upon validating the received JWT token or the authorization token, the firewall proxy sets a site cookie for the domain with the user details and redirects the request to access the web service via the original URL.

Figure 6:
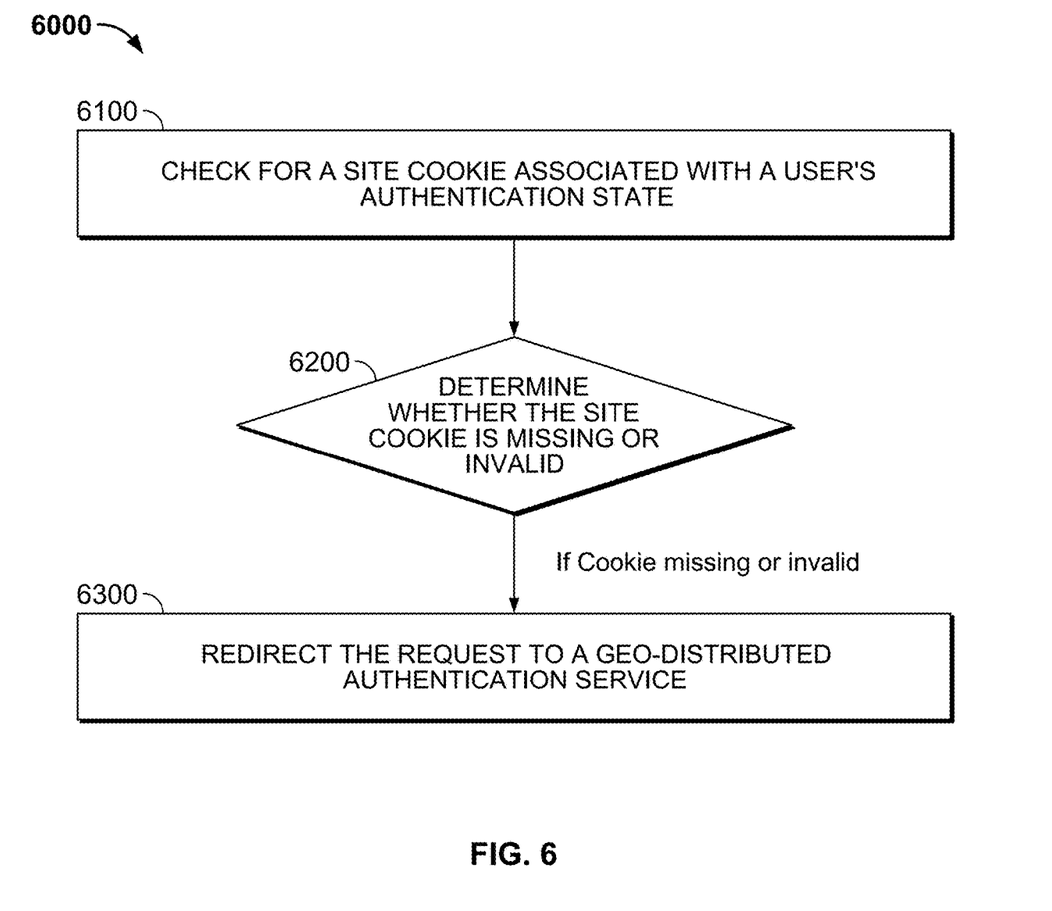
FIG. 6 is a flow diagram illustrating a process for redirecting a request to a geo-distributed authentication service in accordance with some embodiments.

FIG. 6 is a flow diagram illustrating a process for redirecting a request to a geo-distributed authentication service in accordance with some embodiments. In some embodiments, the process 6000 is an implementation of 520 of FIG. 5 and comprises:

In 6100, the firewall proxy checks for a site cookie associated with a user's authentication state.

In 6200, the firewall proxy determines whether the site cookie is missing or invalid.

In the event that the site cookie is missing, that means that the user has not been authenticated by the geo-distributed authentication service via the IdP, or the web service is accessed for the first time and a site cookie was never set for the web service. In the event that the site cookie is invalid, this indicates that the site cookie has expired.

In 6300, in response to a determination that the site cookie is missing or invalid, the firewall proxy redirects the request to a geo-distributed authentication service.

In the event that the site cookie is missing or invalid, the SAML IdP is to authenticate the user before the user is allowed to access the web service.

Figure 7:
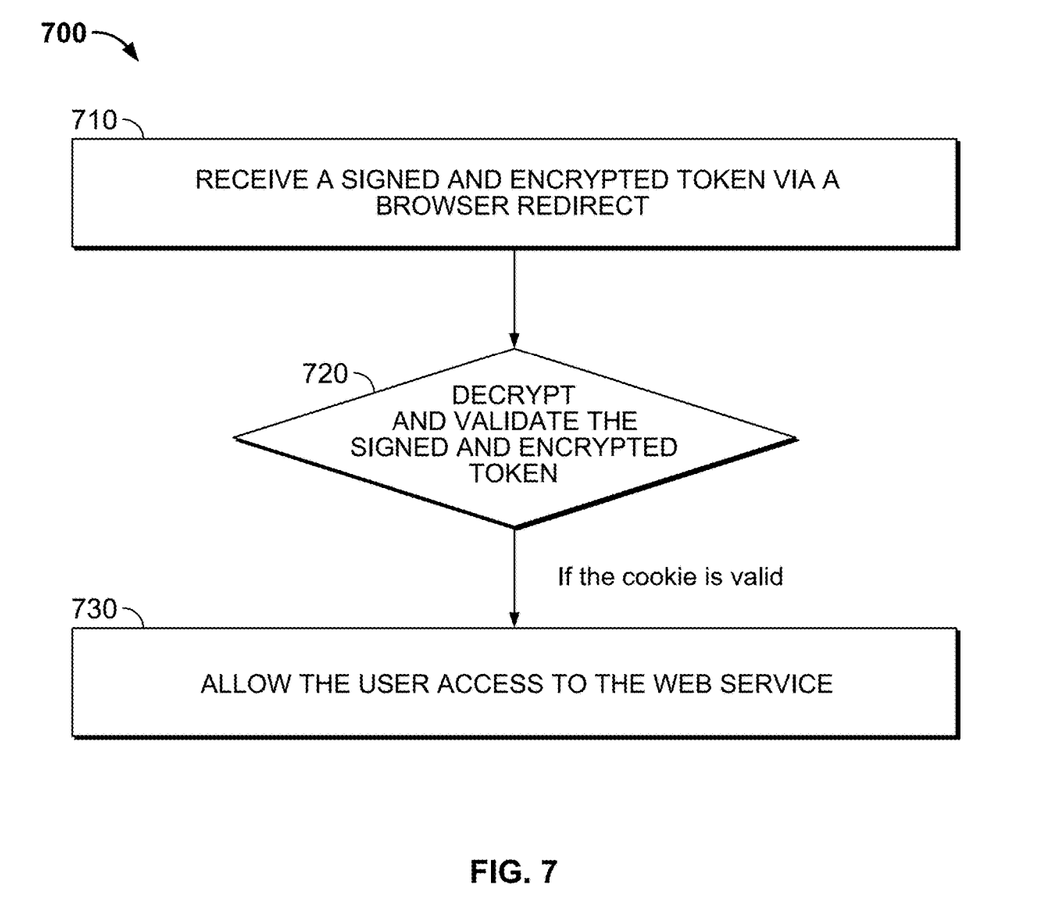
FIG. 7 is a flow diagram illustrating a process for returning an authorization token in accordance with some embodiments.

FIG. 7 is a flow diagram illustrating a process for returning an authorization token in accordance with some embodiments. In some embodiments, the process 700 is an implementation of 530 of FIG. 5 and comprises:

In 710, the firewall proxy receives a signed and encrypted token via a browser redirect.

In 720, upon receiving the signed and encrypted token, the firewall proxy decrypts and validates the signed and encrypted token, sends another redirect to the original URL, and sets a site cookie for the domain with user information.

In some embodiment, after the receiving the signed and encrypted token, the firewall proxy decrypts and validates the signed and encrypted token using a symmetric key. The symmetric key is shared between the firewall proxy and the ACS, so that the firewall proxy is able to decrypt and validate the signed and encrypted token using the shared symmetric key.

In 730, the firewall proxy validates the site cookie and in the event that the site cookie is valid, the firewall proxy allows the user access to the web service.

Figure 8:
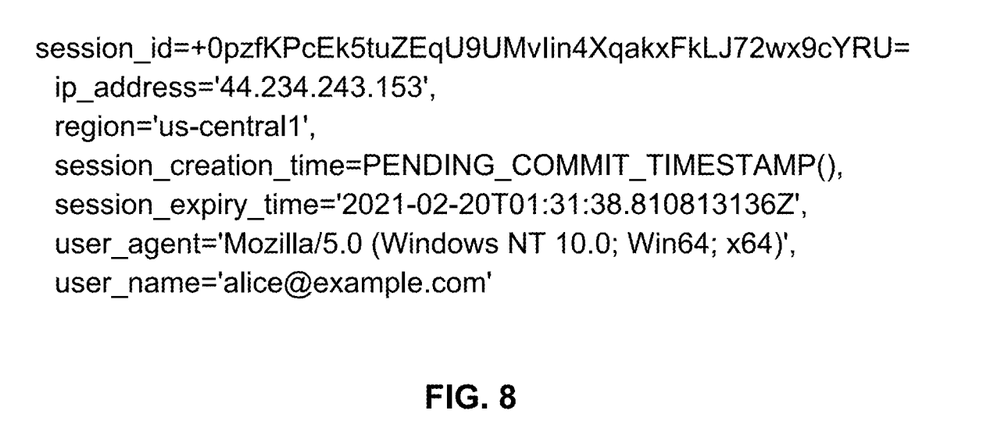
FIG. 8 is an example of an entry stored by the authentication cache service.

FIG. 8 is an example of an entry stored by an authentication cache service.

In this example, the entry includes a session_id field, an ip_address field, a region field, a session_creation_time field, a session_expiry_time field, a user_agent field, and a user_name field. In the example entry, the ip_address field has the value: 44.234.243.153; the region field has the value: us-central1; the session_creation_time field has the value: PENDING_COMIMIT_TIMESTAMP( ); the session_expiry_time field has the value: 2021-02-20T01:31:38.810813136Z; the user_agent field has the value: Mozilla/5.0 (Windows NT 10.0; Win64; x64); and the user_name field has the value: alice@example.com.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A system, comprising:
a processor configured to:
receive a request to access a web service from a client device, comprising to:
send the request to a security processing node (SPN) of a plurality of SPNs for authenticating a user;
redirect, using the SPN, the request to a geo-distributed authentication service including a distributed cache for storing a user's authentication authorization, wherein the distributed cache includes using a geo-replicated database, wherein the geo-replicated database includes a plurality of databases, wherein the plurality of databases includes a first database and a second database, wherein the first database and the second database both cache and distribute authenticated identity state information, wherein the first database is located at a first location across a globe, wherein the second database is located at a second location across the globe, and wherein the redirecting of the request to the geo-distributed authentication service comprises to:

determine, via the distributed cache, whether the geo-distributed authentication service includes a distributed authentication cache cookie, wherein the distributed authentication cache cookie includes an expiration timestamp, wherein the determining comprises to:
  determine that a current time is later than a validity time of the expiration timestamp; and
  in the event that the current time is later than the validity time of the expiration timestamp, determine that the geo-distributed authentication service does not include the distributed authentication cache cookie; and
  in the event that the geo-distributed authentication service does not include the distributed authentication cache cookie:
    establish identity with an independent identity provider, wherein the identity is not established in the event that the distributed authentication cache cookie is included;
    store authenticated state information for the user in the distributed cache; and
    share the authenticated state information using an authorization token, wherein the authorization token includes three or more of the following: the original URL, a current timestamp, a time value of validity, firewall instance id, tenant-id, and/or firewall session-id; and
  return the authorization token included in the distributed authentication cache cookie and uniform resource locator (URL) for the web service to facilitate secure access to the web service from the client device, comprising to:
    receive a signed and encrypted token via a browser redirect;
    upon receiving the signed and encrypted token:
      decrypt and validate the signed and encrypted token;
      send another redirect to the original URL;
      set a site cookie for a domain with user information; and
      validate the site cookie; and
    in the event that the site cookie is valid, allow the user to access the web service via the original URL; and
  a memory coupled to the processor and configured to provide the processor with instructions.

2. The system of claim 1, wherein the processor is further configured to:
  receive another request to access another web service from the client device;
  check for the distributed authentication cache cookie associated with a user's authentication state; and
  in response to a determination that the distributed authentication cache cookie associated with the user's authentication state exists and is valid, allow the other request to go to a URL for the other web service.

3. A method, comprising:
  receiving a request to access a web service from a client device, comprising:
    sending the request to a security processing node (SPN) of a plurality of SPNs for authenticating a user;
  redirecting, using the SPN, the request to a geo-distributed authentication service including a distributed cache for storing a user's authentication authorization, wherein the distributed cache includes using a geo-replicated database, wherein the geo-replicated database includes a plurality of databases, wherein the plurality of databases includes a first database and a second database, wherein the first database and the second database both cache and distribute authenticated identity state information, wherein the first database is located at a first location across a globe, wherein the second database is located at a second location across the globe, and wherein the redirecting of the request to the geo-distributed authentication service comprises:
    determining, via the distributed cache, whether the geo-distributed authentication service includes a distributed authentication cache cookie, wherein the distributed authentication cache cookie includes an expiration timestamp, wherein the determining comprises:
      determining that a current time is later than a validity time of the expiration timestamp; and
      in the event that the current time is later than the validity time of the expiration timestamp, determining that the geo-distributed authentication service does not include the distributed authentication cache cookie; and
    in the event that the geo-distributed authentication service does not include the distributed authentication cache cookie:
      establishing identity with an independent identity provider, wherein the identity is not established in the event that the distributed authentication cache cookie is included;
      storing authenticated state information for the user in the distributed cache; and
      sharing the authenticated state information using an authorization token, wherein the authorization token includes three or more of the following: the original URL, a current timestamp, a time value of validity, firewall instance id, tenant-id, and/or firewall session-id; and
    returning the authorization token included in the distributed authentication cache cookie and uniform resource locator (URL) for the web service to facilitate secure access to the web service from the client device, comprising:
      receiving a signed and encrypted token via a browser redirect;
      upon receiving the signed and encrypted token:
        decrypting and validating the signed and encrypted token;
        sending another redirect to the original URL; and
        setting a site cookie for a domain with user information;
      validating the site cookie; and
      in the event that the site cookie is valid, allowing the user to access the web service via the original URL.

4. The method of claim 3, further comprising:
  receiving another request to access another web service from the client device;
  checking for the distributed authentication cache cookie associated with a user's authentication state; and
  in response to a determination that the distributed authentication cache cookie associated with the user's authentication state exists and is valid, allowing the other request to go to a URL for the other web service.

5. A computer program product embodied in a non-transitory computer readable medium and comprising computer instructions for:
   receiving a request to access a web service from a client device, comprising:
      sending the request to a security processing node (SPN) of a plurality of SPNs for authenticating a user;
   redirecting, using the SPN, the request to a geo-distributed authentication service including a distributed cache for storing a user's authentication authorization, wherein the distributed cache includes using a geo-replicated database, wherein the geo-replicated database includes a plurality of databases, wherein the plurality of databases includes a first database and a second database, wherein the first database and the second database both cache and distribute authenticated identity state information, wherein the first database is located at a first location across a globe, wherein the second database is located at a second location across the globe, and wherein the redirecting of the request to the geo-distributed authentication service comprises:
      determining, via the distributed cache, whether the geo-distributed authentication service includes a distributed authentication cache cookie, wherein the distributed authentication cache cookie includes an expiration timestamp, wherein the determining comprises:
         determining that a current time is later than a validity time of the expiration timestamp; and
         in the event that the current time is later than the validity time of the expiration timestamp, determining that the geo-distributed authentication service does not include the distributed authentication cache cookie; and
      in the event that the geo-distributed authentication service does not include the distributed authentication cache cookie:
         establishing identity with an independent identity provider, wherein the identity is not established in the event that the distributed authentication cache cookie is included;
         storing authenticated state information for the user in the distributed cache; and
         sharing the authenticated state information using an authorization token, wherein the authorization token includes three or more of the following: the original URL, a current timestamp, a time value of validity, firewall instance id, tenant-id, and/or firewall session-id; and
   returning the authorization token included in the distributed authentication cache cookie and uniform resource locator (URL) for the web service to facilitate secure access to the web service from the client device, comprising:
      receiving a signed and encrypted token via a browser redirect;
      upon receiving the signed and encrypted token:
         decrypting and validating the signed and encrypted token;
         sending another redirect to the original URL; and
         setting a site cookie for a domain with user information;
      validating the site cookie; and
      in the event that the site cookie is valid, allowing the user to access the web service via the original URL.

6. The computer program product of claim 5, further comprising computer instructions for:
   receiving another request to access another web service from the client device;
   checking for the distributed authentication cache cookie associated with a user's authentication state; and
   in response to a determination that the distributed authentication cache cookie associated with the user's authentication state exists and is valid, allowing the other request to go to a URL for the other web service.

* * * * *